United States Patent
Clifford

(10) Patent No.: US 11,757,918 B2
(45) Date of Patent: Sep. 12, 2023

(54) CAPABILITY BASED INSIDER THREAT DETECTION

(71) Applicant: NOBLIS, INC., Reston, VA (US)

(72) Inventor: Michael Clifford, Arlington, VA (US)

(73) Assignee: NOBLIS, INC., Reston, VA (US)

( * ) Notice: Subject to any disclaimer, the term of this patent is extended or adjusted under 35 U.S.C. 154(b) by 84 days.

(21) Appl. No.: 17/173,487

(22) Filed: Feb. 11, 2021

(65) Prior Publication Data

US 2021/0258336 A1     Aug. 19, 2021

Related U.S. Application Data

(60) Provisional application No. 62/978,031, filed on Feb. 18, 2020.

(51) Int. Cl.
*H04L 29/00* (2006.01)
*H04L 9/40* (2022.01)

(52) U.S. Cl.
CPC ........ *H04L 63/1433* (2013.01); *H04L 63/101* (2013.01); *H04L 63/102* (2013.01); *H04L 63/20* (2013.01)

(58) Field of Classification Search
CPC ........ G06K 9/6265; G06N 5/04; G06N 20/00; H04L 63/1433; H04L 63/101; H04L 63/102; H04L 63/20; H04L 63/1425
See application file for complete search history.

(56) References Cited

U.S. PATENT DOCUMENTS

| | | | | |
|---|---|---|---|---|
| 8,528,091 | B2* | 9/2013 | Bowen | G06F 21/566 713/168 |
| 8,769,684 | B2* | 7/2014 | Stolfo | G06F 21/55 709/224 |
| 9,009,829 | B2* | 4/2015 | Stolfo | G06F 21/552 726/23 |
| 9,935,772 | B1* | 4/2018 | Madisetti | G06F 21/6209 |
| 10,341,373 | B2* | 7/2019 | Bhatkar | H04L 63/1441 |

(Continued)

OTHER PUBLICATIONS

Eberle, et al., "Insider Threat Detection Using Graph-Based Approaches," Journal of Applied Security Research, vol. 6, Issue 1, Jan. 2011, 5 pages. (Year: 2011).*

(Continued)

*Primary Examiner* — Don G Zhao
(74) *Attorney, Agent, or Firm* — Morrison & Foerster LLP

(57) ABSTRACT

Systems and methods for mitigating cybersecurity threats are provided. A system for mitigating cybersecurity threats may be configured to identify, based on a model of a system, future states, wherein the model depicts a plurality of states for the system and a plurality of capabilities enabling transitions between the plurality of states. Identifying future states may be based on a current state of the system, and the future states may comprise an undesirable state. The system may determine, based on the model of the system, whether the undesirable state is a reachable state, wherein the determination is based on capabilities possessed by an insider entity. In accordance with a determination that the undesirable state is a reachable state, the system may modify a capability possessed by the insider entity, wherein modifying the capability prevents the insider entity from causing the system to transition to the undesirable state.

19 Claims, 4 Drawing Sheets

(56) References Cited

U.S. PATENT DOCUMENTS

| | | | | |
|---|---|---|---|---|
| 10,356,106 B2* | 7/2019 | Engel | ................ | H04L 63/1408 |
| 10,419,450 B2* | 9/2019 | Muddu | ................ | H04L 41/145 |
| 2012/0210388 A1* | 8/2012 | Kolishchak | ........... | G06F 21/552 |
| | | | | 726/1 |
| 2012/0246463 A1* | 9/2012 | Shea | .................... | H04L 63/068 |
| | | | | 713/153 |
| 2017/0251006 A1* | 8/2017 | LaRosa | ............... | H04L 63/1441 |
| 2017/0295197 A1* | 10/2017 | Parimi | ................... | H04L 63/10 |
| 2018/0103052 A1* | 4/2018 | Choudhury | ............. | G06N 3/08 |
| 2018/0191506 A1* | 7/2018 | Vilvovsky | ................ | H04L 9/14 |
| 2018/0219890 A1* | 8/2018 | Rehak | .................... | H04L 63/14 |
| 2018/0375645 A1* | 12/2018 | Hanumantharau | ..... | G06F 16/23 |
| 2019/0207912 A1* | 7/2019 | Nielson | ................ | H04L 9/3239 |
| 2019/0260786 A1* | 8/2019 | Dunn | ................ | G06F 16/2455 |
| 2019/0373136 A1* | 12/2019 | Diaz | .................... | H04L 9/3239 |
| 2019/0394243 A1* | 12/2019 | Wiig | .................. | H04L 63/0876 |
| 2020/0104511 A1* | 4/2020 | Stolfo | .................. | H04L 67/131 |
| 2020/0274894 A1* | 8/2020 | Argoeti | .................. | G06F 7/556 |
| 2020/0285737 A1* | 9/2020 | Kraus | .................. | G06F 21/552 |
| 2021/0203763 A1* | 7/2021 | Vanderwater | ......... | H04L 69/163 |
| 2021/0243208 A1* | 8/2021 | Rubin | .................. | G06F 21/566 |
| 2021/0258336 A1* | 8/2021 | Clifford | ................ | H04L 63/101 |

OTHER PUBLICATIONS

Bishop et al. "Insider Threat Identification by Process Analysis," 2014 IEEE Security and Privacy Workshops, May 17-18, 2014, San Jose, CA; 14 pages.

Clifford. (2012). "The Solar Trust Model, Identity, and Anonymity," University of California Davis Dissertation, 223 pages.

Templeton et al., "A Requires/Provides Model for Computer Attacks," 2000 Workshop on New Security Paradigms, Sep. 18-22, 2000, Ballycotton, County Cork, Ireland; pp. 31-38.

* cited by examiner

CAPABILITY BASED INSIDER THREAT DETECTION

CROSS-REFERENCE TO RELATED APPLICATIONS

This application claims the priority of U.S. Provisional Application No. 62/978,031, filed Feb. 18, 2020, the entire contents of which are incorporated herein by reference.

FIELD

This relates generally to network and computer security, and more specifically to maintaining network and computer security against insider threats.

BACKGROUND

As computer security becomes more critical to the proper functioning of organizations (e.g., corporations or governments), security systems must correspondingly become increasingly robust against all manners of threats. Much research and publicity has been devoted to threats that originate from outside of an organization. These external threats may range from individual hackers to state-sponsored hacking groups who aim to gain unauthorized access to an organization's computer and network systems. External threats may steal sensitive data and/or sabotage operations once they have compromised the integrity of the system. However, insider threats—those threats that originate from within an organization, such as those originating from an employee of the organization—can also pose similarly serious threats to organizational cybersecurity. For example, employees or other authorized users of a network system may be uniquely positioned to access and/or exfiltrate secure data, or to covertly compromise system operations or system integrity.

SUMMARY

As described above, insider threats are a source of organizational cybersecurity risks. Furthermore, insider threats may present different attack vectors than external threats, because insiders may be authorized to operate within one or more computer or network systems of an organization, and insiders may have various permissions that make malicious system access easier to execute and more difficult to detect.

Although external threats to computer and/or network systems may share characteristics of insider threats, insider threat security may involve additional considerations. For example, entities that pose external threats may primarily interact with a computer and/or network system in a malicious capacity. An external threat (e.g., a hacker) may have no relationship with a target system (e.g., a corporation's database of customer information), other than a desire to gain access to sensitive information. An organization may therefore have a wide array of tools at its disposable to both identify and/or mitigate an external threat. For example, an organization may detect that a user from an external IP address has gained access to sensitive data. The IP address may be identified as an unauthorized IP address, and the organization can take steps to mitigate the external threat (e.g., by banning the unauthorized IP address).

It may also be easier to address external threats by eliminating vulnerabilities. For example, an external threat may gain unauthorized access by stringing together one or more bug exploits and/or routine capabilities to form an exploit chain which may exploit a sequence of vulnerabilities to grant a desired result. Bug exploits may be errors and/or unforeseen results of code (e.g., exploiting an error in memory handling may allow the external threat to gain credentials that allow it to falsely validate other actions or impersonate valid entities). Vulnerabilities may therefore be patched once they are discovered, because the utility of the behavior may be vastly outweighed by the risks of allowing the vulnerability to persist. Patching a vulnerability may close and/or hamper an attack vector, and there may be little to no cost in doing so.

By contrast, insider threats may be more difficult to detect and/or more difficult to mitigate than external threats. An insider threat may originate from within an organization, and an entity posing an insider threat may have a prior-established relationship with the organization. For example, all employees of an organization may be considered potential insider threats. An employee of an organization may be granted one or more permissions to operate within the computer and/or network systems of the organization. These permissions can range in severity, scope, and potential impact; for example a salesperson may have permissions only to input sales information into a computer system, whereas a database administrator may be able to wipe a database and/or exfiltrate the database by uploading the data to a location outside of the organization's control.

Unlike external threats, it may not be feasible to revoke all potentially dangerous or potentially exploitable insider permissions to protect the integrity of the computer and/or network systems without unduly hindering critical organizational operations. Organizations often benefit from granting permissions to entities that may be potential insider threats (e.g., employees), and these entities may require various permissions to perform functions on behalf of the organization. For example, an organization may be unable to effectively track sales without allowing one or more entities to input sales data into the organization's computer systems. Similarly, a database administrator may require the ability to wipe the organization's database in order to perform necessary business functions, such as restoring the database from a backup.

Thus, many systems and methods for mitigating cybersecurity threats are not well-suited to mitigate insider cybersecurity threats. Accordingly, there is a need for improved systems, methods, and techniques for detecting and/or mitigating insider threats to computer and/or network systems.

An exemplary system for mitigating cybersecurity threats, comprises: one or more processors; and memory storing one or more programs, wherein the one or more programs are configured to be executable by the one or more processors to cause the system to: identify, based on a model of a system, one or more future states, wherein the model depicts a plurality of states for the system and a plurality of capabilities enabling transitions between the plurality of states, wherein identifying the one or more future states is based on a current state of the system, and wherein the one or more future states comprise an undesirable state; determine, based on the model of the system, whether the undesirable state is a reachable state, wherein the determination is based on one or more capabilities possessed by an insider entity; in accordance with a determination that the undesirable state is a reachable state: modify a capability of the one or more capabilities possessed by the insider entity, wherein modifying the capability prevents the insider entity from causing the system to transition to the undesirable state; and in accordance with a determination that the undesirable state is not a reachable state, forgoing modifying the capability.

In some embodiments, modifying the capability comprises revoking the capability.

In some embodiments, modifying the capability is based on an assessment of an impact of modifying the capability.

In some embodiments, modifying the capability is further based on an assessment of an impact of a dependent capability.

In some embodiments, modifying the capability is based on an impact of a collaterally blocked state.

In some embodiments, modifying the capability is based on an impact of a dependent collaterally blocked state.

In some embodiments, the one or more programs are configured to be executable by the one or more processors to cause the system to: generate a notification corresponding to modifying the capability.

In some embodiments, the entity comprises a person.

In some embodiments, entity is comprises one or more of a program and a device.

In some embodiments, the entity comprises a device.

In some embodiments, the one or more programs are configured to be executable by the one or more processors to cause the system to: designate a future state of the one or more future states as an undesirable state, wherein designating the future state as the undesirable state comprises: receiving policy data, wherein the policy data is associated with the undesirable state; and determining, based on the policy data, whether the future state of the one or more future states corresponds to the undesirable state.

In some embodiments, the one or more programs are configured to be executable by the one or more processors to cause the system to: restore the capability to the insider entity.

In some embodiments, restoring the capability to the insider entity is performed in accordance with an assessment that the system has changed states.

In some embodiments, restoring the capability to the insider entity is performed in accordance with an assessment that the insider entity can no longer cause the system to transition to the undesirable state with the restored capability.

In some embodiments, the one or more programs are configured to be executable by the one or more processors to cause the system to: generate an alert based the determination that the undesirable state is a reachable state.

In some embodiments, the one or more programs are configured to be executable by the one or more processors to cause the system to: generate an event log based the determination that the undesirable state is a reachable state, wherein the event log comprises actions taken by the insider entity.

An exemplary computer-enabled method for mitigating cybersecurity threats, comprises: identifying, based on a model of a system, one or more future states, wherein the model depicts a plurality of states for the system and a plurality of capabilities enabling transitions between the plurality of states, wherein identifying the one or more future states is based on a current state of the system, and wherein the one or more future states comprise an undesirable state; determining, based on the model of the system, whether the undesirable state is a reachable state, wherein the determination is based on one or more capabilities possessed by an insider entity; in accordance with a determination that the undesirable state is a reachable state: modifying a capability of the one or more capabilities possessed by the insider entity, wherein modifying the capability prevents the insider entity from causing the system to transition to the undesirable state; and in accordance with a determination that the undesirable state is not a reachable state, forgoing modifying the capability.

In some embodiments, the computer-enabled method further comprises: designating a future state of the one or more future states as an undesirable state, wherein designating the future state as the undesirable state comprises: receiving policy data, wherein the policy data is associated with the undesirable state; and determining, based on the policy data, whether the future state of the one or more future states corresponds to the undesirable state.

An exemplary non-transitory computer-readable storage medium stores one or more programs for mitigating cybersecurity threats, the one or more programs comprising instructions, which when executed by one or more processors of an electronic device, cause the one or more processors to execute a method comprising: identifying, based on a model of a system, one or more future states, wherein the model depicts a plurality of states for the system and a plurality of capabilities enabling transitions between the plurality of states, wherein identifying the one or more future states is based on a current state of the system, and wherein the one or more future states comprise an undesirable state; determining, based on the model of the system, whether the undesirable state is a reachable state, wherein the determination is based on one or more capabilities possessed by an insider entity; in accordance with a determination that the undesirable state is a reachable state: modifying a capability of the one or more capabilities possessed by the insider entity, wherein modifying the capability prevents the insider entity from causing the system to transition to the undesirable state; and in accordance with a determination that the undesirable state is not a reachable state, forgoing modifying the capability.

In some embodiments, the method further comprises: designating a future state of the one or more future states as an undesirable state, wherein designating the future state as the undesirable state comprises: receiving policy data, wherein the policy data is associated with the undesirable state; and determining, based on the policy data, whether the future state of the one or more future states corresponds to the undesirable state.

In some embodiments, any one or more of the characteristics of any one or more of the systems, methods, and/or computer-readable storage mediums recited above may be combined, in whole or in part, with one another and/or with any other features or characteristics described elsewhere herein.

DETAILED DESCRIPTION

Figure 1:
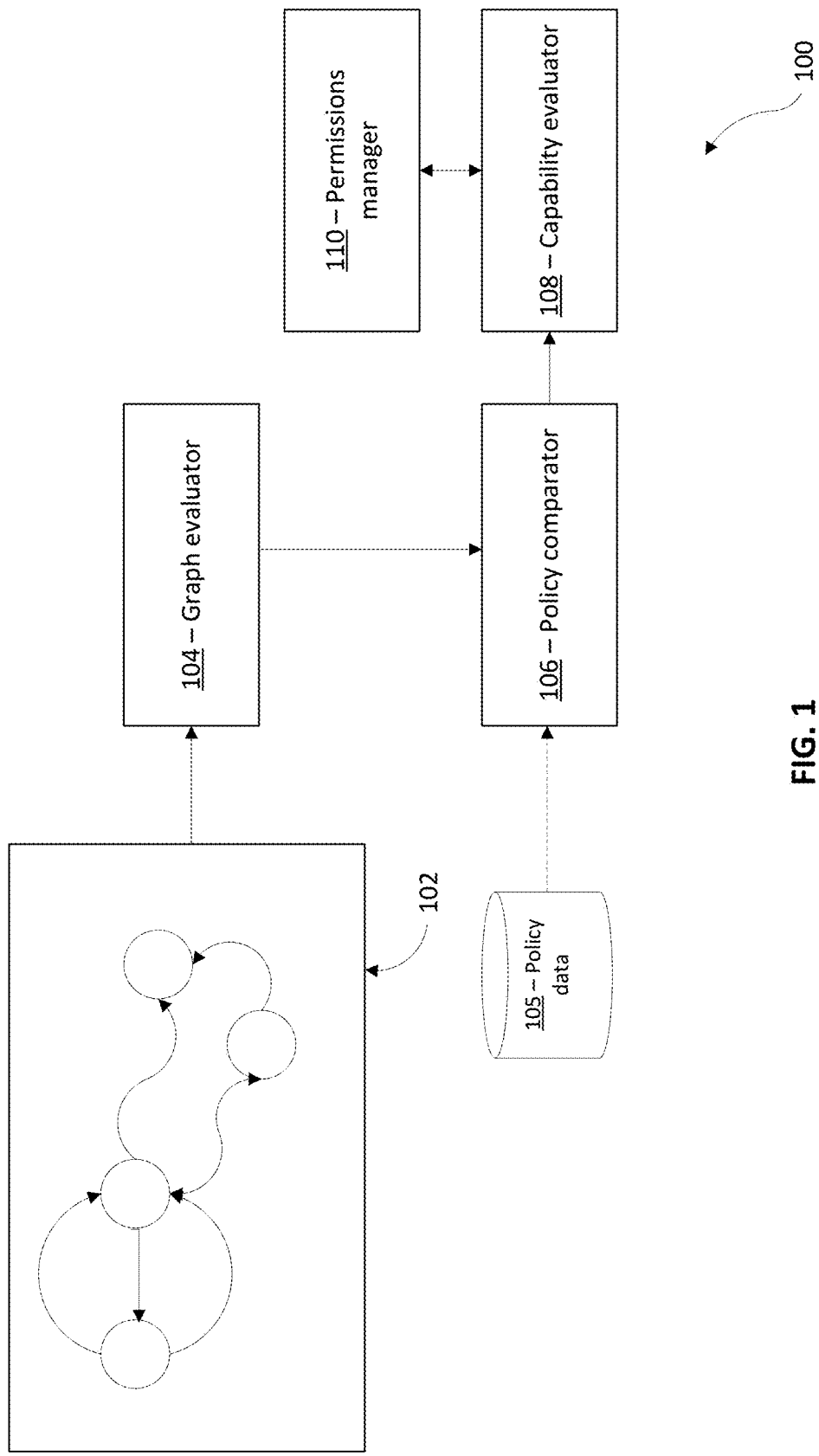
FIG. 1 depicts a system for detecting and mitigating insider threats, according to some embodiments.

Described herein are exemplary embodiments of insider threat detection and mitigation systems and methods that may address the problems and shortcomings of external threat detection and mitigation systems and methods.

In some embodiments, one aspect of insider threat detection and/or mitigation can be that entities (e.g., employees or programs) may need capabilities to operate on behalf of an organization, but these capabilities may be used in a way that presents an insider threat to the organization. For example, a system administrator may be granted capabilities to access certain files within a computer system. The system administrator may also be granted capabilities to access external networks (e.g., the internet or any network that is not administered by the organization itself) from within the organization's network systems. These capabilities may be individually beneficial and/or necessary to grant to the system administrator so that the system administrator can perform desirable functions on behalf of the organization. For example, the system administrator may need to move, edit, copy, and/or delete files within the normal course of their duties, and the system administrator may also need to access external networks within the normal course of their duties (e.g., to email external entities and/or to search the web for solutions to problems the system may be experiencing). It may therefore not be feasible or desirable to limit capabilities such that insider entities do not pose insider threats because the limits may prevent insider entities from performing desirable functions on behalf of an organization.

Although individually, these capabilities may be beneficial and/or necessary to grant to the system administrator, certain permutations of the combination may pose insider threats to a computer and/or network system. For example, the system administrator may have the capability to access external networks and the capability to read and/or write to a file system. The system administrator may use these capabilities to download a necessary file to the file system, and this permutation of the set of individually authorized actions may be taken on behalf of the organization with a benign result. In a second permutation, the same set of capabilities may also allow the same system administrator to access the file system within the organization and to upload one or more files with sensitive information to an external network. The latter permutation may be "authorized" in the sense that each individual action (e.g., accessing a file system and accessing an external network) may be allowed, beneficial, and/or necessary, but the result of these two actions taken together may present an insider threat to an organization's computer and/or network systems. Because limiting capabilities granted to and/or possessed by insider entities may hamstring legitimate insider entity operations, it can be desirable to develop insider threat detection and/or mitigation systems that can guard against insider threats with minimal to no impact on an insider entity's ability to function on behalf of an organization.

Insider Threat Detection System

FIG. 1 depicts an exemplary insider threat detection system 100, in accordance with one or more embodiments of the disclosure. Insider threat detection system 100 may include modules 102, 104, 106, 108, and/or 110. In some embodiments, one or more modules may be combined. In some embodiments, functions provided by one or more modules may be provided by one or more sub-modules. As shown, insider threat detection system 100 may include a capability graph module 102. Capability graph module 102 may comprise any one or more computer systems configured to store a data structure that represents a plurality of states within a computer and/or network system and transitions between the plurality of states. In some embodiments, such a data structure may be referred to as a capability graph. In some embodiments, a state definition can include a representation a current set of objects, capabilities, and/or configurations of a computer/network system. In some embodiments, a state definition can include a representation a current set of objects, capabilities, and/or configurations of a computer/network system in relation to one or more entities. An entity may be anything that interacts with, and/or takes action with respect to, a system and/or objects of a system (e.g., a human, a program, sets of humans or programs, devices such as robots and/or drones, etc.). In some embodiments, one or more capabilities may be required for an entity to interact with and/or take action with respect to an object of a system and/or the system itself. An entity may exercise, use, and/or obtain capabilities within a system. In some embodiments, an entity may cause a system to transition from a first state to a second state by using one or more capabilities (e.g., one or more capabilities granted to the entity by the system, or one or more capabilities that the entity has otherwise gained possession of or control over). An object may be something that an entity can interact with, such as files, authentication tokens, permissions, networks, system resources, or a system itself.

For example, an entity having access to a file/file system/database/folder may be considered all or part of a definition of a state. In some embodiments, an entity having access to a network may be considered all or part of a definition of a state. In some embodiments, an entity being authenticated within a computer and/or network system may be considered all or part of a definition of a state (e.g., being logged in). In some embodiments, a system may have a first state where a file/file system/database/folder exists and a second state where the file/file system/database/folder has been moved/deleted/modified/copied. In some embodiments, a device within a computer and/or network system being on or off may be considered all or part of a definition of a state. In some embodiments, different system settings and/or configurations may be considered states. In some embodiments, a state can be defined in relation to an entity (e.g., a system may have a first state where a user has not been authenticated and a second state where a user has been authenticated). In some embodiments, a state can be defined in relation to objects and/or configurations within a system. For example, a system may have a first state where a firewall has a given port open and a second state where a firewall has the given port closed. As another example, a system may have a first state where a software program has been installed and/or updated and a second state where a software program has not be installed and/or updated. In some embodiments, a state can be defined in relation to entities, objects, and/or configurations (e.g., a system may have a state where a user has been authenticated and a firewall has a given port open). In some embodiments, a state can be defined in relation to specific entities, objects, and/or configurations. For example, a system may have a first state where a first user has access to a file and a second state where a second user has access to the file. Although specific examples of states are described herein, it is contemplated that other configurations and characteristics of system components and/or entities can be considered all or part of definitions of states as well.

In some embodiments, a state may contain and/or be defined by a set of properties of the state. A state property may be defined in relation to an entity and/or a component of a computer and/or network system (e.g., an object, a configuration, and/or a capability). For example, an entity in a terminal and/or command prompt environment may have a property associated with their current file directory location. As another example, a status of one or more ports may be a property of a state. As another example, an enabled/disabled/running/inactive status of a program may be a property of a state. In some embodiments, a state may be defined as a set of one or more state properties, where each property may be a field in a data structure representing the state.

Some states may be considered benign and may facilitate normal operations within an organization. For example, a state where a config file has been altered to optimize a program (e.g., altered by a system administrator) may be considered a benign state that does not pose a threat to the security of an organization.

Some states may be considered harmful and/or undesirable and may compromise the integrity of a computer and/or network system. For example, a state where a sensitive file exists on an external network may be an undesirable state because the file may contain confidential information (e.g., personally identifiable information, trade secrets, etc.). In some embodiments, an altered network configuration (e.g., an opened port) that allows unauthorized entities to obtain unauthorized capabilities (e.g., access to files) may be considered an undesirable state because the computer and/or network system may now be more vulnerable to external threats.

In some embodiments, benign states and harmful/undesirable states may be designated as such by metadata associated with the state. In some embodiments, benign states and harmful/undesirable states may be designated as such in accordance with explicit and/or implicit user input characterizing the state. In some embodiments, benign states and harmful/undesirable states may be designated as such in accordance with an automatic and/or algorithmic determination by the system as to whether the state (e.g., as defined by its one or more state properties) is benign or harmful/undesirable.

Capability Graph

Figure 2:
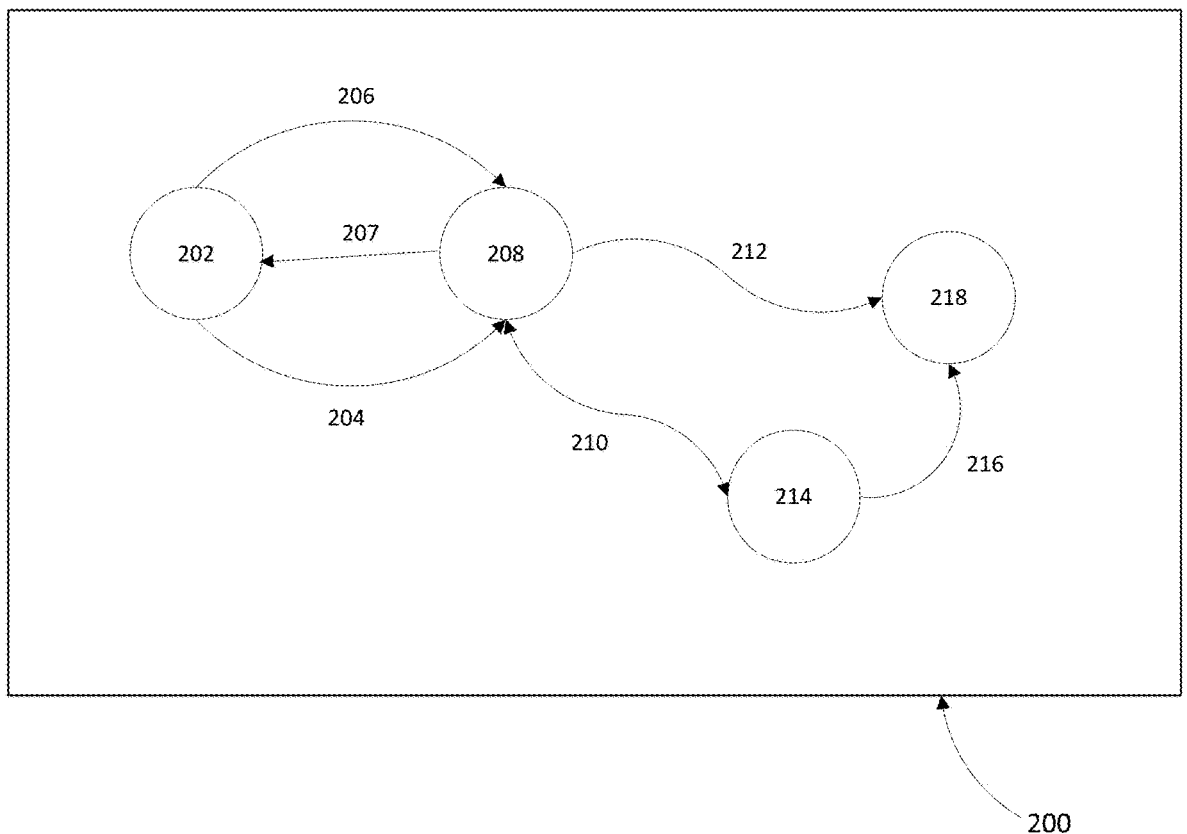
FIG. 2 depicts a schematic representation of an insider capability graph, according to some embodiments.

FIG. 2 illustrates an exemplary schematic representation of an insider capability graph 200, according to one or more embodiments of the disclosure. In some embodiments, insider capability graph 200 may be a data structure stored on and/or in association with capability graph module 102. In some embodiments, insider capability graph 200 may be accessible by capability graph module 102. As shown, insider capability graph 200 models a plurality of states and a plurality of links between the plurality of states. In some embodiments, the links between the plurality of states can represent capability sets required to transition between the plurality of linked states. In some embodiments, no capabilities may be required to cause a system to transition between states. In some embodiments, a capability set can include zero or more capabilities (e.g., abilities with respect to an object or set of objects which may be granted to and/or possessed by an entity). A capability can include an ability to perform an action with respect to an object or set of objects of the system. In some embodiments, one or more capabilities may be represented using permissions granted to an entity with respect to an object. In some embodiments, reaching a state (e.g., the system transitioning from a prior state to the newly-reached state) may result in an entity obtaining additional capabilities (or losing capabilities that it previously possessed). In some embodiments, it may be possible for a transition between the plurality of linked states to occur if the capabilities required to complete one capability set (but not all capability sets) are possessed by the entity. In some embodiments, a capability set may be composed of other capability sets. In some embodiments, a capability set may be regarded as complete if an expression using Boolean algebra and/or First Order Logic that contains the capabilities within that set has been satisfied. In some embodiments, when an entity possesses all of the required capabilities in a capability set, it can be described as "satisfying" that capability set.

For example, state 202 can represent a state where an entity (e.g., a user or a program) has not yet been authenticated by a computer and/or network system. A system may transition from state 202 to state 208 (e.g., through an action by an entity), where state 208 can represent a state where the entity has been authenticated. To cause a system to transition from state 202 to state 208, an entity may utilize a capability set represented by one or more links and/or paths (e.g., capability set 204 or capability set 206). In some embodiments, capability set 204 can include two capabilities: (1) knowledge of a valid username and password combination and (2) the ability to receive a one-time password via a time-based one-time password algorithm. In some embodiments, capability set 206 can include one capability: the ability to provide valid biometric information. If a system exists at state 202 and an entity is able to utilize one or both of capability set 204 and capability set 206, the system may then transition to state 208, which can represent a state where the entity has been authenticated by the computer and/or network system.

In some embodiments, a capability set can be directional. For example, a capability set 206 may be directional because providing biometric information may not allow a state transition from 208 (e.g., an authenticated state) to 202 (e.g., an unauthenticated state). In some embodiments, a capability set can be directionless and/or bidirectional, which may allow the same capability set to be used to cause a system to transition between two or more states in either direction. For example, a capability set that includes free access to a file directory may allow an entity to navigate to any location within a file directory. These actions may cause a system to transition bidirectionally between two states (e.g., where the first state represents an entity having access to a first folder and where the second state represents an entity having access to a second folder).

In some embodiments, it may be possible to cause a system to transition back to a previous state using a different capability set than a previous capability set used for the forward transition. For example, capability set 204 may have been used to transition a system from state 202 to state 208, but capability set 207 (e.g., logging out) may be used to transition a system from state 208 back to state 202. In some embodiments, directional capability sets may not allow a transition back to a previous state using the same capability set.

In some embodiments, an entity may cause a system at state 208 to transition to state 218, which may represent a state where a sensitive file has been copied to an external network. To cause a system to reach state 218 from state 208, the entity may utilize capability set 212. In some embodiments, capability set 212 may include the capability to access the sensitive file and the ability to access the external network.

In some embodiments, an entity may cause a system to transition from state 208 to 218 via one or more alternate paths, which may involve causing the system to transition to one or more intermediate states. For example, a system at state 208, which can represent that a first entity has been authenticated, may transition to state 214, which can represent that a second entity has access to a sensitive file. In some embodiments, a transition from state 208 to state 214 can involve a capability set 210. Capability set 210 may include the capability to send the sensitive file to the second entity (e.g., if the first and second entities are both employees of an organization, capability set 210 may include the ability to attach the sensitive file to an email and to send the email internally within the organization).

In some embodiments, capability set 210 can be directionless and/or bidirectional. An entity possessing a directionless and/or bidirectional capability set may cause a system to transition between two linked states using the same directionless and/or bidirectional capability set. For example, capability set 210 may include the ability to set access permissions to a file. A first entity may use capability set 210 to grant a second entity access to the file, which may cause the system to transition to state 214 from state 208. The first entity may use capability set 210 to revoke a second entity's access to the file, which may cause the system to transition to state 208 from state 214.

In some embodiments, a set of one or more coordinating entities can be treated as a single entity. For example, two coordinating individuals may be treated as a single entity, which may include treating their combined capabilities as accessible to a single entity. In some embodiments, a set of one or more coordinating entities can be represented as a single entity that changes capabilities depending on which child entity (e.g., which individual) is performing an action.

A system at state 214 may then transition to step 218 (which can represent that a sensitive file has been copied to an external network) via an entity exercising capability set 216. Capability set 216 can include the ability for the second entity to access the external network. Because the system may already be at state 214 where the second entity has access to the sensitive file, the only capability needed to reach state 218 may be that the second entity has access to the external network.

In some embodiments, capability graph 200 can model all or substantially all possible states of a computer and/or network system. In some embodiments, capability graph 200 can model all or substantially all paths to transition between the plurality of states. In some embodiments, capability graph 200 can model a subset of states comprising fewer states than all possible states of a computer and/or network system. In some embodiments, a suitable method (e.g., a state pruning and/or state aggregation method) may be used to limit a number of modeled states (e.g., due to computational requirements). In some embodiments, capability graph 200 can model all paths to transition between a plurality of states. In some embodiments, capability graph 200 can model a subset of all paths to transition between a plurality of states. Although a particular example is described above, it is contemplated that capability graph 200 can comprise any number of nodes, any number of capability sets, and/or any number of paths to reach different states. In some embodiments, capability graph 200 can represent more than 1,000 states, more than 10,000 states, more than 100,000 states, or more than 1 million states. In some embodiments, capability graph 200 can represent fewer than 1,000 states, fewer than 10,000 states, fewer than 100,000 states, or fewer than 1 million states. In some embodiments, capability graph 200 can represent more than 10,000 paths between states, more than 100,000 paths between states, more than 1 million paths between states, or more than 10 million paths between states. In some embodiments, capability graph 200 can represent fewer than 10,000 paths between states, fewer than 100,000 paths between states, fewer than 1 million paths between states, or fewer than 10 million paths between states. In some embodiments, state transitions can be directional (e.g., it may be possible to transition from state 214 to state 218, but it may not be possible to transition from state 218 to state 214). In some embodiments, a capability set may be temporary and/or expendable (e.g., the ability to receive a single one-time password may be expended once the one-time password is used). In some embodiments, capability graph 200 can be dynamic (e.g., it may account for temporary and/or expendable capabilities and/or states).

Referring back to FIG. 1, an insider capability graph of capability graph module 102 can be constructed in a number of ways. In some embodiments, an insider capability graph can be constructed based on one or more manual inputs from a creator of the graph. For example, one or more users may define a plurality of states of a computer and/or network system using a user interface. A user may define conditions that represent a state and link one or more states to one or more other states. For example, a user may define a state where any file on a sensitive drive is accessible by an entity while the same entity simultaneously has external network access. A user may also define conditions required to traverse a link between states and whether the link may be traversed bidirectionally. For example, a user may define that a link to reach the described state requires both access to the sensitive drive and access to an external network. In some embodiments, capability graph module 102 can include a list of entities within a system and/or a list of permissions and/or capabilities granted to and/or possessed by each entity.

In some embodiments, an insider capability graph can be constructed automatically. In some embodiments, capability graph module 102 may comprise one or more computer systems configured to execute instructions. For example, capability graph module 102 may be configured to execute a process, which may run in a run-time environment. In some embodiments, capability graph module 102 can be configured to execute a sub-process of a parent process. In some embodiments, capability graph module 102 can be configured to execute a thread of a parent process. In some embodiments, capability graph module 102 can be configured to operate a service (e.g., as a background operating system service). In some embodiments, a process and/or service executed by capability graph module 102 can be configured to continually run (e.g., in the background) while an operating system of a host system is running. In some embodiments, a service executed by capability graph module 102 can be configured as an instantiation of a parent background service, which may serve as a host process to one or more background processes and/or sub-processes.

A process, sub-process, thread, and/or service executed by capability graph module 102 may be integrated into an operating system (e.g., Windows or Linux). For example, a service executed by capability graph module 102 may operate as a background service on host machines (e.g., employee computers). A process, sub-process, thread, and/or service executed by capability graph module 102 may continually monitor system calls made by applications running on a host machine to log occurrences of capability acquisition. For example, an application running on a host machine may request an authentication token from the operating system via a system call. A process, sub-process, thread, and/or service executed by capability graph module 102 may observe this system call and record that the user was able to receive an authentication token from the operating system. A process, sub-process, thread, and/or service executed by capability graph module 102 may then modify and/or create a list of capabilities that the user has to include the authentication token. In some embodiments, a process, sub-process, thread, and/or service executed by capability graph module 102 may operate as a layer between operating system mechanisms that can grant capabilities (e.g., granting an authentication token) and applications that may make system calls to receive the capabilities. For example, the operating system may report a system call and/or a result of a system call to a process, sub-process, thread, and/or service executed by capability graph module 102 before responding to the system call itself.

In some embodiments, a process, sub-process, thread, and/or service executed by capability graph module 102 may not be integrated into an operating system. For example, a process, sub-process, thread, and/or service executed by capability graph module 102 may monitor capabilities such as whether a user has access to certain files. In some embodiments, a process, sub-process, thread, and/or service executed by capability graph module 102 may query an operating system and/or other process, service, or thread to determine what capabilities an entity has obtained. In some embodiments, a process, sub-process, thread, and/or service executed by capability graph module 102 may run with administrative privileges, which may allow it to query the operating system. In some embodiments, a process, sub-process, thread, and/or service executed by capability graph module 102 may query a remote process, sub-process, thread, and/or service over a network. In some embodiments, a process, sub-process, thread, and/or service executed by capability graph module 102 may query multiple remote processes, sub-processes, threads, and/or services locally, over a network, or both locally and over a network.

In some embodiments, capability graph module 102 may be configured to execute a process on a host computer and/or networking hardware (e.g., a router). A process, sub-process, thread, and/or service executed by capability graph module 102 may monitor what entities are able to gain capabilities, such as accessing various parts of a network. In some embodiments, a process, sub-process, thread, and/or service executed by capability graph module 102 may be integrated with network authentication protocols to monitor authentication capabilities. In some embodiments, a process, sub-process, thread, and/or service executed by capability graph module 102 may monitor capabilities by monitoring and/or interfacing with authentication protocols (e.g., Kerberos data).

In some embodiments, capability graph module 102 may be configured to execute a service and/or application programming interface to other software. For example, a process, sub-process, thread, and/or service executed by capability graph module 102 may include a monitoring process/service, which may interface with software that may construct an insider capability graph. In some embodiments, monitoring processes/services of capability graph module 102 may provide a list of entities and capabilities granted to and/or possessed by each entity. In some embodiments, monitoring processes/services of capability graph module 102 may provide a list of states of a computer and/or network system. In some embodiments, monitoring processes/services of capability graph module 102 may provide transition data between states of a computer and/or network system. In some embodiments, graph module 102 may be configured to automatically receive information to be used in constructing a capability graph from one or more data sources, including one or more network monitoring tools, one or more network topology determination systems, one or more databases including information regarding network components and/or entities, one or more scraping tools, one or more enterprise software systems, or the like. In some embodiments, graph module 102 may be configured to receive such information at scheduled intervals, in response to a user instruction to query one or more systems, in response to receiving a transmission from other systems, and/or in accordance with determining that one or more trigger conditions have been met.

In some embodiments, state transitions and/or node edges can be manually defined. For example, a state transition may be defined by a set of preconditions required to enter the state (e.g., capability [A or B] or [C and D] may be required to cause a system to reach state 1). In some embodiments, some preconditions and/or capabilities may only be gained through a particular state. For example, capability C may only be obtainable at state 2, and any subsequent states that require capability C as a precondition may necessitate passing though state 2. In some embodiments, manually defined state transitions and/or preconditions may be used as inputs into one or more suitable graph generation algorithms to generate a capability graph. In some embodiments, a suitable graph generation algorithm may account for design goals. For example, in some embodiments, a graph generation algorithm may be configured to generate a graph to prioritize blocking all potentially threatening insider actions with equal priority. In some embodiments, a graph generation algorithm may be configured to generate a graph such that blocking a state minimizes a cost (e.g., in terms of lost ability to perform desired functions and/or inconvenience) to an insider entity. In some embodiments, a graph generation algorithm may be configured to generate a graph such that blocking a state minimizes a cost to the system and/or other entities in the system.

In some embodiments, a process, sub-process, thread, and/or service executed by capability graph module 102 may run as a local instance for each entity. For example, a process, sub-process, thread, and/or service executed by capability graph module 102 may run on a user's computer to monitor that user's capabilities. In some embodiments, an insider capability graph can be generated for each entity within a computer and/or network system. In some embodiments, a master insider capability graph can be generated (e.g., from monitoring individual capabilities directly and/or from individual insider capability graphs) for all entities within a computer and/or network system. In some embodiments, a capability graph for a system may be generated by combining the capability graphs of subsets and/or components of the system.

Graph Evaluator

As shown, insider threat detection system 100 can include a graph evaluator module 104. Graph evaluator module 104 can read, parse, and/or navigate an insider capability graph (e.g., an insider capability graph stored in capability graph module 102). In some embodiments, graph evaluator module 104 may receive, extract, and/or query a current state of a system (e.g., from capability graph module 102). In some embodiments, graph evaluator module 104 may determine a current state of a system. For example, graph evaluator module 104 may query a system for one or more properties and/or conditions of a system and determine whether properties and/or conditions of a state have been met by the properties and/or conditions of the system. In some embodiments, graph evaluator module 104 may identify one or more predefined states as future states, for example because they may be directionally linked (e.g., in a "downstream" direction) to a current state of the system. In some embodiments, a future state may be identified in relation to a given/current state. For example, any state that can be transitioned to from a given/current state may be considered a future state. In some embodiments, a state that is linked to a given/current state but cannot be reached from the given/current state (e.g., because the link is directional) may not be considered a future state. In some embodiments, a future state may be determined without relation to an entity. For example, as long as a capability set can cause a transition to a state, the state may be considered a future state (regardless of whether an entity has the requisite capability set). In some embodiments, graph evaluator module 104 can functionally determine one or more future states. In some embodiments, graph evaluator module 104 can modify metadata and/or capability graph 102 to indicate that one or more states should be considered future states.

In some embodiments, only states that can be immediately reached from a given/current state may be considered a future state. For example, referring back to FIG. 2, only state 208 may be considered a future state if state 202 is the given/current state because state 208 is the only state that can be immediately reached from state 202 (e.g., because only one capability set and/or link is needed to transition between state 202 and state 208 and/or no other states will be reached during the transition). As another example, if state 208 is the given/current state, then state 202, state 214, and state 218 may all be considered future states because states 202, 214, and 218 may all be reached by using one capability set and/or no other intermediate states will be reached during a transition between state 208 and any one of states 202, 214, and 218.

In some embodiments, graph evaluator module 104 may have a configurable search range, which may define future states based on how deep to search an insider capability graph. For example, any states that can be reached within a threshold number of transitions/steps may be considered future states. If state 202 is a given/current state and the threshold number of search steps is two, then states 208, 214, and 218 may all be considered future states. States 208, 214, and 218 may all be considered future states because they may be reached in no more than two steps (e.g., state transitions) from state 202. In some embodiments, state 202 may be considered reachable within two steps of state 202 (e.g., via state 208 as an intermediate state) as a cycle (e.g., a path where the same state may appear more than once). In some embodiments, cycles may be permitted in a graph path evaluation. In some embodiments, cycles may not be permitted in a graph path evaluation.

A threshold number of search steps may be manually defined by a user (e.g., a user configuring an insider threat detection system). In some embodiments, a threshold number of search steps may be automatically defined (e.g., using machine learning). In some embodiments, a threshold number of search steps may be a dynamic value. For example, a threshold number of search steps may vary according to a particular entity (e.g., a more risky entity may be associated with a higher number of threshold search steps). As another example, a threshold number of search steps may vary according is a particular state (e.g., a more risky state may be associated with a higher number of threshold search steps, regardless of what entities may approach the risky state). In some embodiments, using a larger threshold number of search steps can increase computational requirements for graph evaluator module 104.

In some embodiments, a future state may be determined in relation to an undesirable state (e.g., a warning "fence" may be set up around undesirable states such that once a system or entity crosses the warning "fence," one or more actions may be triggered). For example, if state 218 is an undesirable state (e.g., a state where a sensitive file has been uploaded to an external network), the set of permitted future states may be determined based on a threshold number of search steps that must be traversed to reach the undesirable state. In some alternate embodiments, graph evaluator module 104 may search for future states using bidirectional links and/or reversed directional links (e.g., links that directionally point toward the undesirable state). Graph evaluator module 104 may determine whether the system is in a future state (which may be a configurable number of search steps away from the undesirable state).

Graph evaluator module 104 may comprise one or more computer systems configured to execute instructions. For example, graph evaluator module 104 can be configured to execute a process, which may run in a run-time environment. In some embodiments, graph evaluator module 104 can be configured to execute a sub-process of a parent process. In some embodiments, graph evaluator module 104 can be configured to execute a thread of a parent process. In some embodiments, graph evaluator module 104 can operate a service (e.g., as a background operating system service). In some embodiments, a process, sub-process, thread, and/or service executed by graph evaluator module 104 can be configured to continually run (e.g., in the background) while an operating system of a host system is running. In some embodiments, a service executed by graph evaluator module 104 can be an instantiation of a parent background service, which may serve as a host process to one or more background processes and/or sub-processes.

In some embodiments, a process, sub-process, thread, and/or service executed by graph evaluator module 104 may run locally on a host machine. For example, each user's computer may run a local instance of a process, sub-process, thread, and/or service executed by graph evaluator module 104, which may monitor each user's actions on the computer and/or network system.

In some embodiments, a process, sub-process, thread, and/or service executed by graph evaluator module 104 may run in a different location than capability graph module 102. For example, a process, sub-process, thread, and/or service executed by graph evaluator module 104 may run on a different computer than capability graph module 102. In some embodiments, a process, sub-process, thread, and/or service executed by graph evaluator module 104 may run on a centralized system within an organization's computer and/or network system, and a process, sub-process, thread, and/or service executed by graph evaluator module 104 may monitor all entities within an organization for insider threat detection. In some embodiments, graph evaluator module 104 may be distributed among and/or executed on a plurality of systems. In some embodiments, each component of module 104 may execute in parallel, sequentially, or in any combination of two or more systems of the plurality of systems.

In some embodiments, a process, sub-process, thread, and/or service executed by graph evaluator module 104 may run outside of an organization's computer and/or network system. For example, a process, sub-process, thread, and/or service executed by graph evaluator module 104 may run on an external system like a cloud-based computing platforms (e.g., Amazon Web Services or Microsoft Azure). A process, sub-process, thread, and/or service executed by graph evaluator module 104 may receive one or more insider capability graphs built for a particular computer and/or network system and continuously evaluate the insider capability graphs based on current states of entities within the computer and/or network system and the capabilities granted to or possessed the entities.

Policy Comparator

As shown, insider threat detection system 100 may include policy comparator module 106. Policy comparator module 106 can determine if any future states are undesirable states based on policy data. In some embodiments, policy comparator module 106 may receive, extract, and/or query information about future states (e.g., from graph evaluator module 104). In some embodiments, policy comparator module 106 may receive, extract, and/or query policy information (e.g., from policy data module 105). In some embodiments, policy comparator module 106 may designate one or more states (e.g., one or more future states identified by graph evaluator module 104) as undesirable states. Policy comparator module 106 may designate a state as an undesirable state based on policy information received from policy data module 105. For example, policy data module 105 may include a set of policy conditions where simultaneously having external network access and access to a sensitive file directory may be unacceptable and/or undesired. Policy comparator module 106 may identify one or more states (e.g., one or more future states identified by graph evaluator module 104) as matching a set of policy conditions and may designate the one or more states as undesirable states.

In some embodiments, designating a state as an undesirable state can include comparing one or more properties of a state with one or more policy conditions. In some embodiments, if all policy conditions in a set of policy conditions are met by a single state, that state may be designated as an undesirable state. In some embodiments, policy comparator module 106 may evaluate only states identified as future states (e.g., by graph evaluator 104). In some embodiments, policy comparator module 106 may evaluate all states in an insider capability graph.

In some embodiments, designating a state as an undesirable state can include modifying an insider capability graph (e.g., insider capability graph 200) and/or associated data (e.g., metadata of the insider capability graph). In some embodiments, designating a state as an undesirable state can include modifying a copy of an insider capability graph (e.g., one or more future states may be stored in a memory of policy comparator module 106). In some embodiments, designating a state as an undesirable state can include storing an identifier associated with the undesirable state in a memory.

Policy comparator module 106 can comprise one or more computer systems configured to execute instructions. For example, policy comparator module 106 may be configured to execute a process, which may run in a run-time environment. In some embodiments, policy comparator module 106 can be configured to execute a sub-process of a parent process. In some embodiments, policy comparator module 106 can be configured to execute a thread of a parent process. In some embodiments, policy comparator module 106 can be configured to operate a service (e.g., as a background operating system service). In some embodiments, a process, sub-process, thread, and/or service executed by policy comparator module 106 can be configured to continually run (e.g., in the background) while an operating system of a host system is running. In some embodiments, a service executed by policy comparator module 106 can be an instantiation of a parent background service, which may serve as a host process to one or more background processes and/or sub-processes.

In some embodiments, a process, sub-process, thread, and/or service executed by policy comparator module 106 may run locally on a host machine. For example, each user's computer may run a local instance of a process, sub-process, thread, and/or service executed by graph evaluator module 104, which may monitor each user's actions on the computer and/or network system.

In some embodiments, a process, sub-process, thread, and/or service executed by policy comparator module 106 may run in a different location than a process, sub-process, thread, and/or service executed by capability graph module 102. For example, a process, sub-process, thread, and/or service executed by policy comparator module 106 may run on a different computer than a process, sub-process, thread, and/or service executed by capability graph module 102. In some embodiments, a process, sub-process, thread, and/or service executed by policy comparator module 106 may run on a centralized system within an organization's computer and/or network system, and a process, sub-process, thread, and/or service executed by policy comparator module 106 may monitor all entities within an organization for insider threat detection. In some embodiments, policy evaluator module 106 may be distributed among and/or executed on a plurality of systems. In some embodiments, each component of module 106 may execute in parallel, sequentially, or in any combination of two or more systems of the plurality of systems.

In some embodiments, a process, sub-process, thread, and/or service executed by policy comparator module 106 may run outside of an organization's computer and/or network system. For example, a process, sub-process, thread, and/or service executed by policy comparator module 106 may run on an external system like a cloud-based computing platforms (e.g., Amazon Web Services or Microsoft Azure). A process, sub-process, thread, and/or service executed by policy comparator module 106 may receive one or more insider capability graphs built for a particular computer and/or network system and continuously evaluate the insider capability graphs based on current states of entities within the computer and/or network system and the capabilities granted to and/or possessed by the entities.

Policy data module 105 can comprise one or more computer systems configured to store (or otherwise provide access to) policy information, which may be accessible to policy comparator module 104. In some embodiments, policy data module 105 can be a database of policy information, which may include and/or be defined by one or more sets of policy conditions. In some embodiments, the policy data module may be manually constructed. For example, a user may manually define policy conditions and/or define a group of policy conditions as a specific policy. Any suitable policy description language may be used. In some embodiments, the policy conditions may be dynamically generated or altered.

In some embodiments, policy data module 105 can comprise one or more computer systems configured to execute instructions. For example, policy data module 105 can be configured to execute a process, sub-process, thread, and/or service that may serve as a policy interpreter. A policy interpreter may convert a set of policies (which may be defined in a particular policy language) into a format that may be useable by insider threat detection system 100 (e.g., policy comparator 106 of insider threat detection system 100).

Capability Evaluator

As shown, insider threat detection system 100 may include capability evaluator module 108. Capability evaluator module 108 can determine if an entity can cause a system to reach an undesirable state. Capability evaluator module 108 may receive, extract, and/or query undesirable state information and/or capability information (e.g., from policy comparator module 106, graph evaluator module 104, and/or capability graph module 102). Capability evaluator module 108 may determine whether an entity can cause a system to reach an undesirable state (e.g., whether an entity is able to exercise a capability set that causes the system to transition to the undesirable state), given a system's current state and one or more capabilities granted to and/or possessed by an entity. For example, referring back to FIG. 2, state 218 may have been designated as an undesirable state (e.g., by policy comparator module 106). If a system is at state 208, capability evaluator module 108 may determine whether the entity is able to cause the system to reach state 218 based on one or more capabilities granted or possessed by to the entity. Capability evaluator module 208 may evaluate capabilities granted to and/or possessed by the entity against a capability set required to transition the system from state 208 to state 218 (e.g., capability set 212). If the entity is determined to have capability set 212 (e.g., if the capabilities granted to and/or possessed by the entity include the capabilities needed for capability set 212), capability evaluator module 108 may determine that the undesirable state is a reachable state. If the entity is determined to not have capability set 212, capability evaluator module 108 may determine that the undesirable state is not a reachable state.

In some embodiments, if the entity is determined to not have capability set 212, capability evaluator module 108 may determine if the entity has capability set 210 (e.g., because it is possible to reach state 218 through an intermediary path, which may require capability set 210). If it is determined that the entity has capability set 210, capability evaluator module 108 may determine if the entity has capability set 216. In some embodiments, capability evaluator module 108 may determine if the entity will have capability set 216 in the future. For example, an entity may not have capability set 216 at state 208, but the entity may obtain one or more capabilities by reaching state 214 such that at state 214, the entity may have capability set 216. If it is determined that the entity has and/or will have capability set 216, capability evaluator module 108 may determine that state 218 is a reachable state.

In some embodiments, capability evaluator module 108 may speculatively evaluate an entity's ability to effect state transitions. For example, capability evaluator module 108 may determine whether an entity may cause a system to transition states with one or more capabilities that an entity may not currently possess. In some embodiments, capability evaluator module 108 may speculatively assume that an entity has and/or will have capabilities that the entity may not have in reality. For example, if a capability may be gained via a state that the entity may reach, capability graph module 108 may evaluate the entity's reach by assuming the entity has access to that capability (even if the entity has not yet caused the system to reach that state).

In some embodiments, capability evaluator module 108 may only evaluate if undesirable states are reachable states. In some embodiments, capability evaluator module 108 may evaluate if any future states (e.g., states identified by graph evaluator module 104 that may be linked to a current state) are reachable (e.g., if a linked/future state may be reached given an entity and its capabilities). In some embodiments, capability evaluator module 108 may have a configurable search range (which may correspond to a configurable search range for graph evaluator 104). For example, if an entity is at state 202 and a search range has been configured at two search steps, capability evaluator module 108 may determine if the entity has either capability set 204 or capability set 206. If it is determined that the entity has either capability set 204 or capability set 206, capability evaluator module 108 may determine if the entity has capability set 212. If it is determined that the entity has capability set 212, capability evaluator module 108 may determine that state 218 is a reachable state. In some embodiments, capability evaluator module 108 may not determine if an entity has capability sets 210 or 216 because they may not be used to reach state 218 in two steps from state 202.

Capability evaluator module 108 can comprise one or more computer systems configured to execute instructions. For example, capability evaluator module 108 may be configured to execute a process, which may run in a run-time environment. In some embodiments, capability evaluator module 108 can be configured to execute a sub-process of a parent process. In some embodiments, capability evaluator module 108 can be configured to execute a thread of a parent process. In some embodiments, capability evaluator module 108 can be configured to operate a service (e.g., as a background operating system service). In some embodiments, a process, sub-process, thread, and/or service executed by capability evaluator module 108 can be configured to continually run (e.g., in the background) while an operating system of a host system is running. In some embodiments, a service executed by capability evaluator module 108 can be an instantiation of a parent background service, which may serve as a host process to one or more background processes and/or sub-processes. In some embodiments, capability evaluator module 108 may be distributed among and/or execute on a plurality of systems. In some embodiments, each component of module 108 may execute in parallel, sequentially, or in any combination of the two or more systems of the plurality of systems.

In some embodiments, a process, sub-process, thread, and/or service executed by capability evaluator module 108 may run locally on a host machine. For example, each user's computer may run a local instance of a process, sub-process, thread, and/or service executed by capability evaluator module 108, which may monitor each user's actions on the computer and/or network system.

In some embodiments, a process, sub-process, thread, and/or service executed by capability evaluator module 108 may run in a different location than capability graph module 102. For example, a process, sub-process, thread, and/or service executed by capability evaluator module 108 may run on a different computer than a process, sub-process, thread, and/or service executed by capability graph module 102. In some embodiments, a process, sub-process, thread, and/or service executed by capability evaluator module 108 may run on a centralized system within an organization's computer and/or network system, and a process, sub-process, thread, and/or service executed by capability evaluator module 108 may monitor all entities within an organization for insider threat detection.

In some embodiments, a process, sub-process, thread, and/or service executed by capability evaluator module 108 may run outside of an organization's computer and/or network system. For example, a process, sub-process, thread, and/or service executed by capability evaluator module 108 may run on an external system like a cloud-based computing platforms (e.g., Amazon Web Services or Microsoft Azure). A process, sub-process, thread, and/or service executed by capability evaluator module 108 may receive one or more insider capability graphs built for a particular computer and/or network system and continuously evaluate the insider capability graphs based on current states of entities within the computer and/or network system and the capabilities granted to and/or possessed by the entities.

Capability Manager

As shown, insider threat detection system 100 may include capability manager module 110. Capability manager module 110 can determine one or more actions to take in response to an undesirable state being designated as a reachable state. Capability manager module 110 may receive, extract, and/or query information on states that are both undesirable and reachable (e.g., from capability evaluator module 108). Capability manager module 110 may modify (e.g., change, revoke, and/or disable) one or more capabilities granted to and/or possessed by an entity such that one or more states that are both undesirable and reachable are no longer reachable. In some embodiments, capability manager module 110 may modify only one capability within a capability set. In some embodiments, capability manager module 110 may modify all capabilities within a capability set.

In some embodiments, capability manager module 110 may modify one or more capabilities such that an impact to an entity and/or computer/network system is mitigated. For example, each capability granted to and/or possessed by an entity may be ordered (e.g., by a user or a machine learning algorithm) from most to least impactful if the capability was executed on the object associated with that capability, or if the entity were at specific states. Capability manager module 110 may modify the least impactful capability such that an undesirable state is no longer reachable by an entity. In some embodiments, capabilities may have dependencies (e.g., an e-mail capability may be dependent on both an internal network access capability and an external network access capability). Capability dependencies may be graphed or otherwise stored in an orderly manner, and each capability may be assigned a weight. Capability manager module 110 may calculate a total weight of modifying a capability by summing all the weights of the capability and any dependent capabilities. Capability manager module 110 may modify only a capability with the lowest total weight such that an undesirable state is no longer reachable. In some embodiments, capability manager module 110 can determine which capability set of two or more capability sets would be least impactful (e.g., least negatively impactful) to modify. For example, referring back to FIG. 2, a system at state 202 may have two capability sets that allow the system to transition to state 208. Capability manager module 110 can evaluate which of capability set 206 and capability set 204 would be least impactful to modify and accordingly modify the least impactful capability set.

In some embodiments, one or more states can be assigned a quantitative measure of importance. For example, modifying one or more capabilities may cause one or more benign/desirable states to become unreachable as an unintended consequence of causing an undesirable state to be unreachable. In some embodiments, capability manager module 110 can modify one or more capabilities such that a cost of blocking desirable states is minimized. In some embodiments, one or more states can be assigned various weights that may represent how costly it can be to block the state. Capability manager module 110 can evaluate each capability within a capability set to see which capability, if modified, will block the least impactful desirable states. In some embodiments, states can have dependencies (e.g., a second state may only be reachable from a first state, which has been collaterally blocked as a consequence of blocking the undesirable state). Capability manager module 110 may calculate a total weight of modifying a capability by summing all weights of the blocked state and any dependent states that are also blocked. In some embodiments, the computed weight may include the sum of the weights of each individual blocked state multiplied by the costs associated with the state being blocked. In some embodiments, the computed weight may include the weighted sum of all resulting blocked states rather than those belonging to the least impactful set. In some embodiments, if a dependent state is otherwise reachable, such as by a different path, despite the blocked state being blocked, then the system may account for the fact that the dependent state is still reachable, including by accounting for a level of difficulty or complexity (e.g., number of steps, capabilities, or entities required to traverse the alternate path(s)) of reaching the state by one or more alternate paths. In some embodiments, accounting for said alternate paths may comprise modifying a summed cost of blocking the blocked state and/or weighting one or more addends of the summed cost. In some embodiments, capability manager module 110 may modify only a capability that results in the lowest total weight of blocked desirable states.

In some embodiments, capability manager module 110 may issue an alert to a different entity (e.g., a system administrator) as a result of a determination that an undesirable state is reachable to an entity. In some embodiments, capability manager module 110 may restore one or more capabilities to an entity such that the capabilities are the same as before capability manager module 110 made any modifications. This can be desirable because an entity may require their original capabilities to carry out functions on behalf of an organization, and modified capabilities may hamper that effort.

In some embodiments, capability manager module 110 may restore one or more capabilities to an entity once the entity is no longer able to reach an undesirable state, even if the capabilities have been restored. For example, if an entity has moved to another state such that the entity is no longer one (or any configured number) transition away from an undesirable state, capabilities may be restored to the entity. If the entity moves to a state that is one (or any configured number) transition away from an undesirable state, one or more capabilities may be modified such that the entity can no longer reach the undesirable state. For example, referring back to FIG. 2, state 218 may represent a state where a sensitive file has been copied to an external network. State 208 may represent a state where an entity has access to the sensitive file and access to an external network simultaneously. Capability manager module 110 may revoke the entity's access to all external networks while the entity has access to the sensitive file. Capability manager module 110 may then restore access to external networks once the entity no longer has access to the sensitive file (e.g., once the entity has moved away from a file directory containing the sensitive file). In some embodiments, capability manager module 110 may only restore one or more capabilities to an entity once the system has transitioned to a new state. For example, a system may be at state 208, and capability manager module 110 may have modified one or more capabilities in capability set 212. Once the system transitions to state 214, capability manager module 110 may restore the one or more modified capabilities in capability set 212. In some embodiments, capability manager module 110 may only restore the one or more modified capabilities in capability set 212 if that one or more modified capabilities is not part of capability set 216.

Capability manager module 110 can comprise one or more computer systems configured to execute instructions. For example, capability manager module 110 may be configured to execute a process, which may run in a run-time environment. In some embodiments, capability manager module 110 can be configured to execute a sub-process of a parent process. In some embodiments, capability manager module 110 can be configured to execute a thread of a parent process. In some embodiments, capability manager module 110 can be configured to operate a service (e.g., as a background operating system service). In some embodiments, a process, sub-process, thread, and/or service executed by capability manager module 110 can be configured to continually run (e.g., in the background) while an operating system of a host system is running. In some embodiments, a service executed by capability manager module 110 can be an instantiation of a parent background service, which may serve as a host process to one or more background processes and/or sub-processes. In some embodiments, a process, sub-process, thread, and/or service executed by capability manager module 110 may operate with root/admin/superuser privileges.

A process, sub-process, thread, and/or service executed by capability manager module 110 may be integrated into an operating system (e.g., Windows or Linux). For example, a process, sub-process, thread, and/or service executed by capability manager module 110 may operate as a background service on host machines (e.g., employee computers). A process, sub-process, thread, and/or service executed by capability manager module 110 may be able to modify/disable/revoke capabilities granted to and/or possessed by an entity (e.g., a user or a program).

In some embodiments, a process, sub-process, thread, and/or service executed by capability manager module 110 may not be integrated into an operating system. For example, a process, sub-process, thread, and/or service executed by capability manager module 110 may make a system call to the operating system to modify/disable/revoke capabilities granted to and/or possessed by an entity.

In some embodiments, a process, sub-process, thread, and/or service executed by capability manager module 110 may run on a host computer and/or networking hardware (e.g., a router). A process, sub-process, thread, and/or service executed by capability manager module 110 may modify/disable/revoke an entity's connection to a network such that an undesirable state is not reachable. In some embodiments, a process, sub-process, thread, and/or service executed by capability manager module 110 may refuse to authenticate an entity. In some embodiments, the capability manager module 110 may remove a capability that is not related to authentication or network access from an entity. For example, capability manager module 110 may modify/disable/revoke an entity's ability to access one or more files, module 110 may terminate one or more processes, module 110 may execute one or more programs, module 110 may obtain a list of processes running for an entity, etc.

In some embodiments, a process, sub-process, thread, and/or service executed by capability manager module 110 may include a service and/or application programming interface to lower-level software or to a client. For example, a process, sub-process, thread, and/or service executed by capability manager module 110 may determine that a capability should be modified, and a process, sub-process, thread, and/or service executed by capability manager module 110 may contact a local machine and request that a capability be modified. In some embodiments, a process, sub-process, thread, and/or service executed by capability manager module 110 may run on a centralized machine that may communicate with client machines within a computer and/or network system. In some embodiments, a process, sub-process, thread, and/or service executed by capability manager module 110 may run outside of a computer and/or network system in a different computer and/or network system (e.g., on a cloud-based platform). In some embodiments, capability manager module 110 may be distributed among and/or executed on a plurality of systems. In some embodiments, each component of module 110 may execute in parallel, sequentially, or in any combination of two or more systems of the plurality of systems.

Although FIG. 1 is shown as having a capability graph module 102, a graph evaluator module 104, a policy data module 105, a policy comparator 106, a capability evaluator 108, and a capability manager 110, it is also contemplated that one or more of the components of FIG. 1 may be provided as different components of a combined computing system, such as different processes executable by a single processor; and/or that one or more of the components of FIG. 1 may be provided as a single processing component or module.

Exemplary Methods

Figure 3:
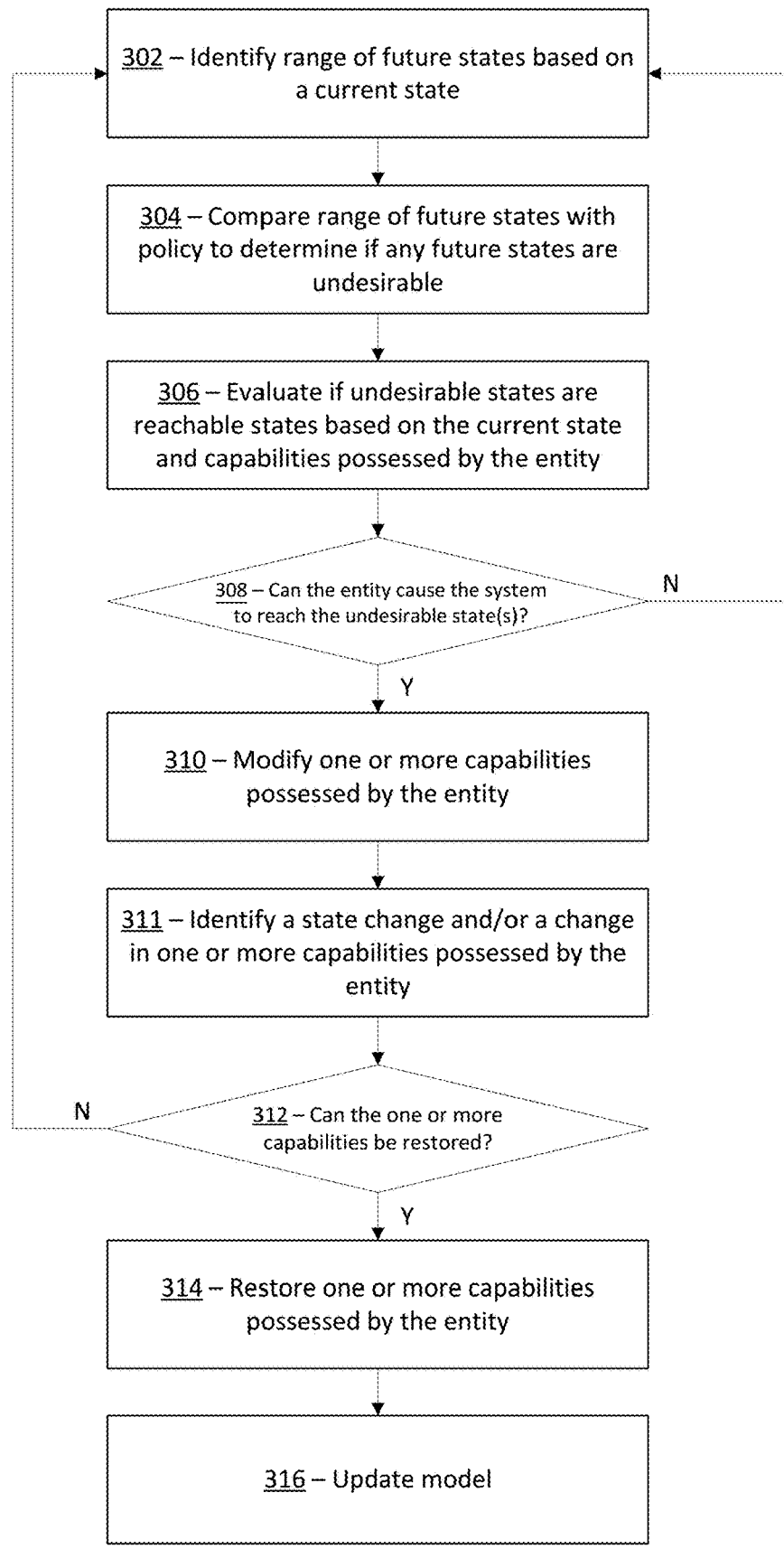
FIG. 3 depicts a flowchart representing an exemplary method for detecting and mitigating insider threats, according to some embodiments.

FIG. 3 illustrates an exemplary process for identifying and/or mitigating insider threats, which may be executed by insider threat detection system 100. As shown, at step 302, a range of future states may be identified based on a current state of a system and/or a current capability set of an entity. In some embodiments, graph evaluator module 104 may identify a range of future states based on a configurable search radius and a current state of a system. In some embodiments, a current state of a system may be provided by a device (e.g., an entity's device which may be part of the system), or may be determined (e.g., by graph evaluator module 104) from information provided by a device. In some embodiments, a current state of a system may be provided by one or more sensors and/or monitoring tools configured to sense/monitor one or more characteristics of one or more components of a system.

At step 304, the identified range of future states may be compared to with policy information to determine if one or more of the future states are undesirable states. In some embodiments, policy comparator module 106 may designate a future state as undesirable if all policy conditions in a set of policy conditions are met through a state or properties of a state.

At step 306, it can be determined if one or more undesirable states are reachable based on a current state of the system and capabilities granted to and/or possessed by an entity. In some embodiments, capability evaluator module 108 may evaluate if undesirable states are reachable if an entity has or will have the capability sets to reach an undesirable state within a configurable number of steps.

At step 308, if it is determined that the entity can cause the system to reach one or more undesirable states within a configurable number of steps, the process can proceed to step 310. If it is determined that the entity cannot cause the system to reach one or more undesirable states within a configurable number of steps, the process may reset to step 302 (e.g., when the entity moves to a different state).

At step 310, one or more capabilities granted to and/or possessed by the entity can be modified such that the entity can no longer reach the one or more reachable undesirable states. In some embodiments, capability manager module 110 may modify one or more capabilities. In some embodiments, capability manager module 110 may modify the least number and/or least impactful capability or permissions to prevent the entity from reaching the undesirable state.

At step 311, a change in the system state and/or a change in one or more capabilities possessed by an entity can be detected. In some embodiments, a system state change or entity capability set change may be detected by a process, sub-process, thread, and/or service executed by capability graph module 102 (e.g., a process, sub-process, thread, and/or service executed by capability graph module 102 used to create and/or configure an insider capability graph). In some embodiments, a system state change or entity capability set change may be reflected by an insider capability graph stored in capability graph module 102 (e.g., through a change in metadata). In some embodiments, a state change may be determined by graph evaluator module 104. For example, graph evaluator module 104 may query a system for one or more properties and/or conditions of a system and determine whether properties and/or conditions of a state have been met by the properties and/or conditions of the system. In some embodiments, a state change can represent a system transitioning from a first state (which may be a desirable state) to a second state (which may be a desirable state) while a third state (which may be an undesirable state) is blocked. In some embodiments, in response to the state change being detected, the system may update the capability graph to represent the detected state change (e.g., via a change in metadata). In some embodiments, in response to a detected change in one or more capabilities possessed by an entity, the system may update the capability graph to represent a changed set of states that the entity may cause the system to transition to (e.g., via a change in metadata).

At step 312, it can be determined, in accordance with the updated capability graph, if the one or more modified capabilities can be restored. For example, it may be determined that an entity may cause a system to transition from a first state to a second, undesirable state using a first capability set. The first capability set may be modified such that the entity can no longer cause the system to transition from the first state to the second, undesirable state. It may be detected that the system has transitioned to a third state. At step 312, it may be determined if the entity can cause the system to transition to an undesirable state (e.g., the second state or a fourth state) using the first capability set. If it is determined that the entity cannot cause the system to transition to an undesirable state from the third state using the first capability set, the first capability set may be restored to the entity. In some embodiments, capability evaluator module 108 may determine if the one or more modified capabilities can be restored. In some embodiments, capability evaluator module 108 can determine whether an entity can cause the system to reach an undesirable state from the new state if the one or more modified capabilities are restored to the entity. In some embodiments, step 312 can include one or more determinations made at steps 302, 304, 306, and/or 308. For example, at step 312, a range of future states can be identified based on the detected state change. One or more undesirable states may be identified based on policy data and the range of future states. Reachable undesirable states may be identified based on the current system state and/or capabilities possessed by an entity. In some embodiments, reachable undesirable states may be identified based on the current system state and/or a proposed restoration to the entity of one or more modified capabilities. If it is determined that the entity cannot cause the system to transition to an undesirable state with the restored capabilities, the process may proceed to step 314. If it is determined that the entity can still cause the system to transition to an undesirable state with the restored capabilities, the process may loop back to step 302.

At step 314, one or more capabilities (e.g., one or more modified permissions) may be restored to the entity. In some embodiments, capability manager 110 may restore one or more capabilities such that the entity has the same capabilities as before the capability manager module 110 made any modifications.

In some embodiments, systems and methods disclosed herein may incorporate one or more machine learning algorithms that utilize the output of insider threat detection system 100 to learn to create and improve policies for policy comparator 106. In some embodiments, one or more machine learning algorithms may be incorporated that utilize the output of insider threat detection system 100 to learn to choose and/or improve responses to potential insider threats. In some embodiments, these responses can be implemented and/or instantiated by the machine learning algorithms using capability manager 110. In some embodiments, a combination of policies and responses may take into account metrics such as cost, user impact, and system impact. In some embodiments, these metrics may be used as additional inputs into the machine learning algorithms.

Although computer and/or network systems are described above, it is also contemplated that systems and methods disclosed herein can be applied to other contexts (e.g., physical security). For example, a capability graph may model states of a person within a physical area. Referring back to FIG. 2, state 202 may represent a state where a person is outside of a building. State 208 may represent a state where the person is inside an atrium of the building. Capability set 204 may include possession of a key to the front door of the building. Capability set 206 may include convincing security personnel at the front desk to open the front door of the building. State 218 may represent a state where confidential manufacturing practices have been stolen. State 208 may transition to state 218 via capability set 212, which can include the ability to access the secured cleanroom and the ability to record inside the secured cleanroom. State 208 may also transition to state 214, which may represent the ability to access a security room that has video footage of the secured cleanroom. A transition from state 208 to state 214 may be achieved via capability set 210, which can include knowledge of the security code to enter the security room. State 214 can transition to state 218 via capability set 216, which may include the ability to record video footage of the secured cleanroom.

There may be several advantages to using systems and methods described herein to identify and/or mitigate insider threats as compared to other systems and methods. First, systems and methods described herein may allow for more granular control of entity actions, capabilities, or permissions than current operating and/or network systems can allow. For example, an operating system may not allow an administrator to prevent specific files from being copied to external networks. However, insider threat detection system 100 may disable connections to an external network while an entity has access to the specific files. Because the external network capability may be restored once the entity no longer has access to the specific files, the entity may be minimally impacted by security measures imposed by insider threat detection system 100. By contrast, a conventional operating system may have to remove external network access for an entire system (e.g., a computer) because the system may contain sensitive files. An entity may be required to use a different system (e.g., computer) to access external networks.

Second, systems and methods described herein may be more accurate at identifying insider threats, yielding both fewer false positives and fewer false negatives than conventional systems. For examples, systems and methods described herein may consider the combination of an entity's capabilities, a system's states, and the possible transitions between those states to identify insider threats. Systems and methods described herein may be blind to motivation and/or intent. An entity that compromises the integrity of a computer and/or network system (e.g., by copying a sensitive file to an external network) by accident may be just as dangerous as an entity that intentionally does so. Systems and methods that account for historical user behavior may fail to detect a user as an insider threat if the user accidentally compromises a system's security when the user has no history of malicious intent. User behavior may also vary in a wide range, even for non-malicious users, which can make it difficult to predicate insider threat detection on historical user behavior.

Third, systems and methods described herein may successfully identify insider threats when the same capabilities needed for authorized purposes can combine and/or be used for unauthorized purposes. For example, compliance-based systems may identify only that an entity has a capability that it does not need to perform its function, and that capability can be safely removed. However, compliance-based systems may not be able to identify an insider threat when a combination of capabilities needed to pose an insider threat are also needed to perform authorized functions. Similarly, user training may help detect and/or prevent unusual user behaviors, but user-training may not be able to prevent insider threats, whether malicious or non-malicious, that utilize authorized behaviors for unauthorized purposes.

Computing Components

Figure 4:
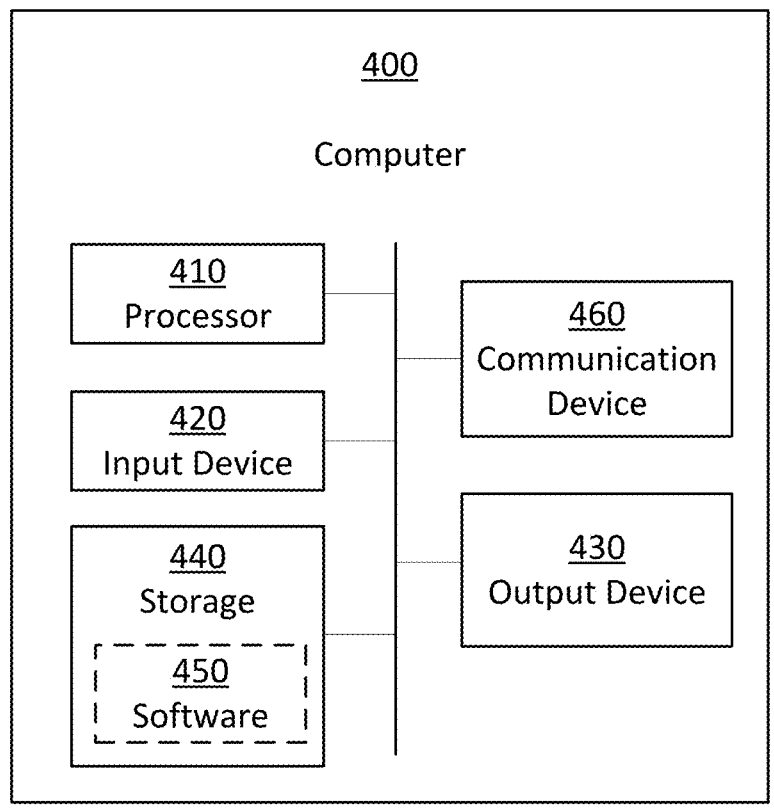
FIG. 4 depicts a computer, according to some embodiments.

FIG. 4 illustrates a computer, in accordance with some embodiments. Computer 400 can be a component of a system for detecting and/or mitigating insider threats, such as system 100 and/or any of its subcomponents described above with respect to FIG. 1. In some embodiments, computer 400 may be configured to execute a method for detecting and/or mitigating insider threats, such as all or part of method 300 of FIG. 3. In some embodiments, computer 400 may be configured to build and/or generate an insider capability graph, such as insider capability graph 200 of FIG. 2. In some embodiments, computer 400 may be configured to execute any of the other techniques discussed herein, alone and/or in combination with one another and/or with method 300.

Computer 400 can be a host computer connected to a network. Computer 400 can be a client computer or a server. As shown in FIG. 4, computer 400 can be any suitable type of microprocessor-based device, such as a personal computer; workstation; server; or handheld computing device, such as a phone or tablet. The computer can include, for example, one or more of processor 410, input device 420, output device 430, storage 440, and communication device 460.

Input device 420 can be any suitable device that provides input, such as a touch screen or monitor, keyboard, mouse, or voice-recognition device. Output device 430 can be any suitable device that provides output, such as a touch screen, monitor, printer, disk drive, or speaker.

Storage 440 can be any suitable device that provides storage, such as an electrical, magnetic, or optical memory, including a RAM, cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein, such as all or part of method 300 described with respect to FIG. 3.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can be implemented and executed on a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines. Computer 400 may be composed of components which are interconnected across a network, such as a distributed system. Computer 400 may be organized into any suitable topology, such as a star topology, a recursively defined topology, a mesh topology, a ring topology, or an ad-hoc topology.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for mitigating cybersecurity threats, comprising:
    one or more processors; and
    memory storing one or more programs, wherein the one or more programs are configured to be executable by the one or more processors to cause the system to:
        identify, based on a model of a target system, one or more future states, wherein the model depicts a plurality of states for the target system and a plurality of capabilities enabling transitions between the plurality of states, wherein identifying the one or more future states is based on a current state of the target system, and wherein the one or more future states comprise an undesirable state;
        determine, based on the model of the target system, whether the undesirable state is a reachable state, wherein the determination is based on one or more capabilities possessed by an insider entity;
        in accordance with a determination that the undesirable state is a reachable state:
            modify a capability of the one or more capabilities possessed by the insider entity, wherein modifying the capability prevents the insider entity from causing the target system to transition to the undesirable state, and wherein modifying the capability is based on an assessment of an impact of modifying the capability; and
        in accordance with a determination that the undesirable state is not a reachable state, forgoing modifying the capability.

2. The system of claim 1, wherein modifying the capability comprises revoking the capability.

3. The system of claim 1, wherein modifying the capability is further based on an assessment of an impact of a dependent capability.

4. The system of claim 1, wherein modifying the capability is based on an impact of a collaterally blocked state.

5. The system of claim 4, wherein modifying the capability is based on an impact of a dependent collaterally blocked state.

6. The system of claim 1, wherein the one or more programs are configured to be executable by the one or more processors to cause the system to:
    generate a notification corresponding to modifying the capability.

7. The system of claim 1, wherein the entity comprises a person.

8. The system of claim 1, wherein the entity comprises one or more of a program and a device.

9. The system of claim 1, wherein the entity comprises a device.

10. The system of claim 1, wherein the one or more programs are configured to be executable by the one or more processors to cause the system to:
    designate a future state of the one or more future states as an undesirable state, wherein designating the future state as the undesirable state comprises:
        receiving policy data, wherein the policy data is associated with the undesirable state; and
        determining, based on the policy data, whether the future state of the one or more future states corresponds to the undesirable state.

11. The system of claim 1, wherein the one or more programs are configured to be executable by the one or more processors to cause the system to:
    restore the capability to the insider entity.

12. The system of claim 11, wherein restoring the capability to the insider entity is performed in accordance with an assessment that the target system has changed states.

13. The system of claim 11, wherein restoring the capability to the insider entity is performed in accordance with an assessment that the insider entity can no longer cause the target system to transition to the undesirable state with the restored capability.

14. The system of claim 1, wherein the one or more programs are configured to be executable by the one or more processors to cause the system to:
    generate an alert based the determination that the undesirable state is a reachable state.

15. The system of claim 1, wherein the one or more programs are configured to be executable by the one or more processors to cause the system to:
    generate an event log based the determination that the undesirable state is a reachable state, wherein the event log comprises actions taken by the insider entity.

16. A computer-enabled method for mitigating cybersecurity threats, comprising:
    identifying, based on a model of a system, one or more future states, wherein the model depicts a plurality of states for the system and a plurality of capabilities enabling transitions between the plurality of states, wherein identifying the one or more future states is based on a current state of the system, and wherein the one or more future states comprise an undesirable state; and
    determining, based on the model of the system, that the undesirable state is a reachable state, wherein the determination is based on one or more capabilities possessed by an insider entity; and
    in accordance with the determination that the undesirable state is a reachable state:
        modifying a capability of the one or more capabilities possessed by the insider entity, wherein modifying the capability prevents the insider entity from causing the system to transition to the undesirable state.

17. The computer-enabled method of claim 16, further comprising:
    designating a future state of the one or more future states as an undesirable state, wherein designating the future state as the undesirable state comprises:
        receiving policy data, wherein the policy data is associated with the undesirable state; and determining, based on the policy data, whether the future state of the one or more future states corresponds to the undesirable state.

18. A non-transitory computer-readable storage medium storing one or more programs for mitigating cybersecurity threats, the one or more programs comprising instructions, which when executed by one or more processors of an electronic device, cause the one or more processors to execute a method comprising:

identifying, based on a model of a system, one or more future states, wherein the model depicts a plurality of states for the system and a plurality of capabilities enabling transitions between the plurality of states, wherein identifying the one or more future states is based on a current state of the system, and wherein the one or more future states comprise an undesirable state;

determining, based on the model of the system, whether the undesirable state is a reachable state, wherein the determination is based on one or more capabilities possessed by an insider entity;

in accordance with a determination that the undesirable state is a reachable state:

modifying a capability of the one or more capabilities possessed by the insider entity, wherein modifying the capability prevents the insider entity from causing the system to transition to the undesirable state, and wherein modifying the capability is based on an assessment of an impact of modifying the capability; and in accordance with a determination that the undesirable state is not a reachable state, forgoing modifying the capability.

19. The non-transitory computer-readable storage medium of claim 18, the method further comprising:

designating a future state of the one or more future states as an undesirable state, wherein designating the future state as the undesirable state comprises:

receiving policy data, wherein the policy data is associated with the undesirable state; and determining, based on the policy data, whether the future state of the one or more future states corresponds to the undesirable state.

\* \* \* \* \*